US008572098B2

(12) United States Patent
Weare

(10) Patent No.: US 8,572,098 B2
(45) Date of Patent: Oct. 29, 2013

(54) CLIENT PLAYLIST GENERATION

(75) Inventor: Christopher B. Weare, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 359 days.

(21) Appl. No.: 12/577,374

(22) Filed: Oct. 12, 2009

(65) Prior Publication Data
US 2011/0087665 A1    Apr. 14, 2011

(51) Int. Cl.
G06F 17/30    (2006.01)
(52) U.S. Cl.
USPC ......................................................... 707/749
(58) Field of Classification Search
USPC .................. 707/737, 749, 999.006, 999.107, 707/E17.009, E17.046, E17.051, E17.101
See application file for complete search history.

(56) References Cited

U.S. PATENT DOCUMENTS

| 6,694,311 | B1 * | 2/2004 | Smith ................................... 1/1 |
| 7,080,253 | B2 * | 7/2006 | Weare ........................... 713/176 |
| 7,548,934 | B1 * | 6/2009 | Platt et al. .............................. 1/1 |
| 2006/0112098 | A1 | 5/2006 | Renshaw et al. |
| 2009/0055376 | A1 | 2/2009 | Slaney et al. |
| 2009/0144273 | A1 * | 6/2009 | Kappos ............................. 707/5 |
| 2009/0144780 | A1 | 6/2009 | Toebes et al. |
| 2009/0158155 | A1 | 6/2009 | Quinn et al. |
| 2012/0095982 | A1 * | 4/2012 | Lennington et al. .......... 707/706 |

OTHER PUBLICATIONS

Datar et al., "Locality-Sensitive Hashing Scheme Based on p-Stable Distributions", SGC '04, Jun. 9-11, 2004, p. 255.*
Casey, et al., "Song Intersection by Approximate Nearest Neighbor Search", Retrieved at <<http://ismir2006.ismir.net/PAPERS/ISMIR06177_Paper.pdf>>, pp. 6.
Bennett, Joel, "A Survey of SOM and Recommender Techniques", Aug. 22, 2006, Retrieved at <<http://huddledmasses.org/downloads/recommender/Research.pdf>?>, pp. 29.
Cheung, Sen-Ching, "Efficient Video Similarity Measurement and Search", Retrieved at <<http://www-video.eecs.berkeley.edu/papers/cheungsc/PhdThesis.pdf>>, pp. 161.
Masip, et al., "Boosted Linear Projections for Discriminant Analysis", Retrieved at <<http://www.cvc.uab.es/~jordi/MasipCCIA2004.pdf>>, pp. 8.
Chen, et al., "Collaborative Filtering for Information Recommendation Systems", Retrieved at <<http://imsc-dmim.usc.edu/publications/121new.pdf>>, pp. 11.
Ragno, et al., "Inferring Similarity between Music Objects with Application to Playlist Generation", Retrieved at <<http://research.microsoft.com/en-us/um/people/cburges/papers/acm_sigmm_mir_05.pdf>>, pp. 8.

* cited by examiner

*Primary Examiner* — Anteneh Girma
*Assistant Examiner* — Randall Burns
(74) *Attorney, Agent, or Firm* — Wolfe-SBMC

(57) ABSTRACT

Client playlist generation is described. In embodiments, relationships between media assets are determined to identify similar media assets that can be included in an automatic playlist of the similar media assets. Projection vectors of the asset-to-asset relationships can be generated for each of the media assets, where a projection vector for a media asset identifies the similar media assets. The projection vectors are then communicated to a client device that utilizes the projection vectors to generate the automatic playlist for any one of the media assets that is selected as a starting media asset of the automatic playlist.

19 Claims, 5 Drawing Sheets

CLIENT PLAYLIST GENERATION

BACKGROUND

Users interact with media assets, such as to play music or watch a video on a portable media player. A user can also subscribe to a music service from which music tracks and other media assets can be downloaded or otherwise accessed. The music service may also dynamically generate a playlist of music tracks for a user based on previous user selections and/or similarities to other music. One technique that is implemented at a music service to generate a playlist of recommended music tracks is collaborative filtering that is utilized to determine relationships between various music tracks. However, for any given music track or song, there may be thousands of other music tracks determined to be similar based on various relatable factors.

For a music library of millions of songs, such as one would expect to find available from a music service, the quantity of data needed to account for all of the possible relationships between the various music tracks is exceedingly voluminous. Conventional user devices, such as a portable media player, do not have near enough memory to store the relationship data for just a user's music collection that is available on the portable media player. Thus, a user device that is not connected or on-line with the music service will not be able to access or receive a dynamically generated playlist of music tracks if requested by a user of the device.

SUMMARY

This summary is provided to introduce simplified concepts of client playlist generation. The simplified concepts are further described below in the Detailed Description. This summary is not intended to identify essential features of the claimed subject matter, nor is it intended for use in determining the scope of the claimed subject matter.

Client playlist generation is described. In embodiments, relationships between media assets are determined to identify similar media assets that can be included in an automatic playlist of the similar media assets. Media assets may include digital files of music tracks, books that are stored as digital media, and video programs, such as movies or music videos. Projection vectors of the asset-to-asset relationships can be generated for each of the media assets, where a projection vector for a media asset identifies the similar media assets. The projection vectors are then communicated to a client device that utilizes the projection vectors to generate the automatic playlist for any one of the media assets that is selected as a starting media asset of the automatic playlist.

In other embodiments, the media assets are music tracks and a music service provider utilizes random projection to generate projection vectors of track-to-track relationships for each of the music tracks. The track-to-track relationships identify similar music tracks that can be used for generation of an automatic playlist of the similar music tracks. The projection vectors are then communicated to a client device that utilizes the projection vectors to generate the automatic playlist for any one of the music tracks that is selected as a starting music track of the automatic playlist. The client device can generate the automatic playlist when off-line from the music service provider.

BRIEF DESCRIPTION OF THE DRAWINGS

Embodiments of client playlist generation are described with reference to the following drawings. The same numbers are used throughout the drawings to reference like features and components.

DETAILED DESCRIPTION

Embodiments of client playlist generation provide techniques to associate similar media assets at a service provider, and then provide a client device with the asset relationship data that can be used to generate an automatic playlist when the client device is off-line from the service provider. For example, a music service provider can generate projection vectors for each music track, where a projection vector represents track-to-track relationships for each music track to other similar music tracks. The projection vectors are then communicated to a client device that utilizes the projection vectors to generate the automatic playlist for any one of the music tracks that is selected as a starting music track of the automatic playlist. A user can select one or more musical tracks as seeds to initiate generation of the automatic playlist at a client device, and then a list of music tracks is recommended from a music library of music tracks stored on the client device that are similar to the selected music tracks.

While features and concepts of the described systems and methods for client playlist generation can be implemented in any number of different environments, systems, and/or various configurations, embodiments of client playlist generation are described in the context of the following example systems and environments.

Figure 1:
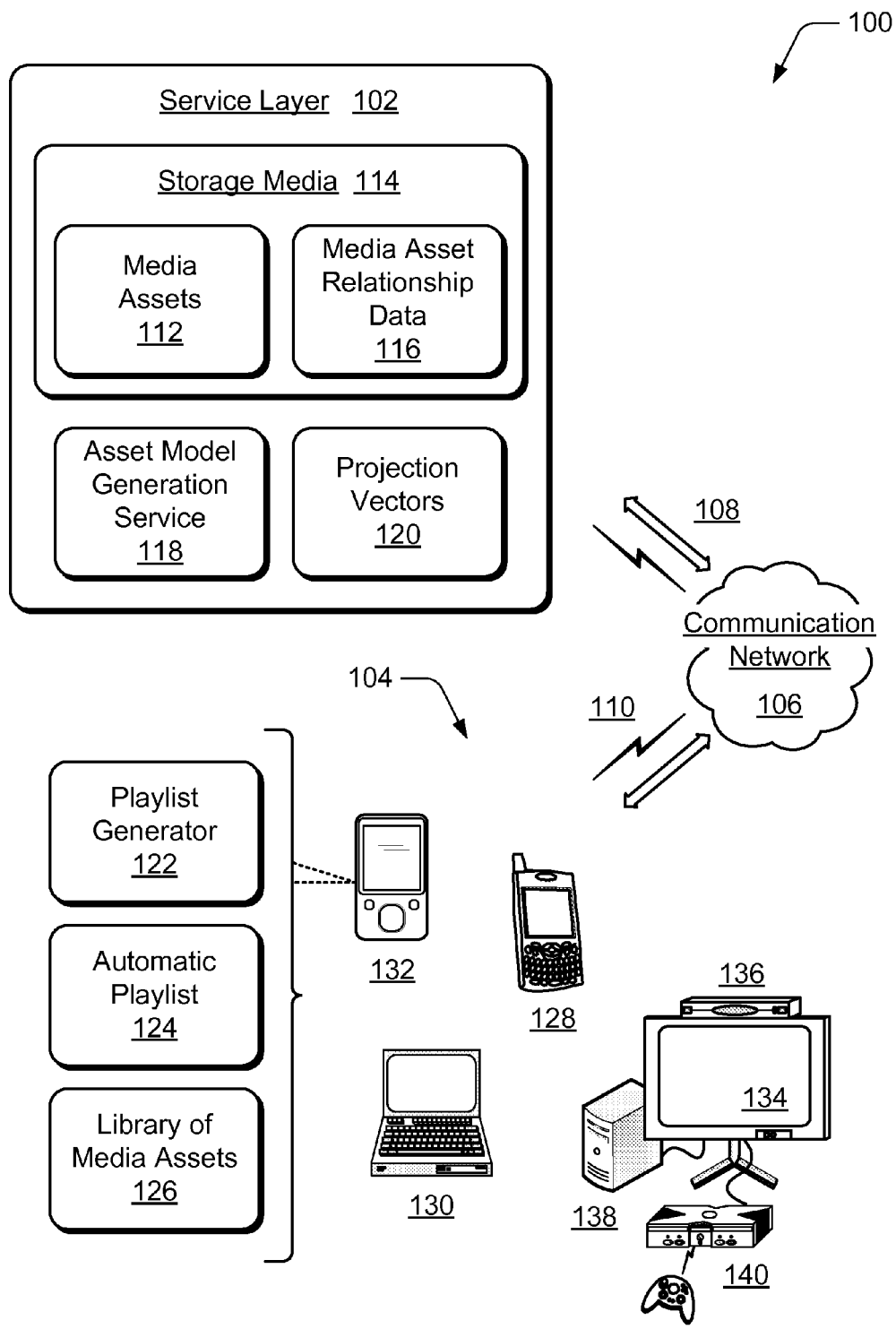
FIG. 1 illustrates an example system in which embodiments of client playlist generation can be implemented.

FIG. 1 illustrates an example system 100 in which various embodiments of client playlist generation can be implemented. In this example, system 100 includes a service layer 102 that can be configured to communicate or otherwise provide media assets and data to any number of various client devices 104 via a communication network 106. Some of the client devices 104 may also be referred to as portable devices and/or user devices. The client devices 104 can include wired and/or wireless devices, some of which may be implemented as components in a client system of a media asset distribution system.

The communication network 106 can be implemented to include a broadcast network, an IP-based network 108, and/or a wireless network 110 that facilitates media asset distribution and data communication between the service layer 102 and any number of the various devices. The communication network 106 can also be implemented as part of a media asset distribution system using any type of network topology and/or communication protocol, and can be represented or otherwise implemented as a combination of two or more networks.

Service layer 102 can include one or more media content servers that are implemented to communicate, or otherwise distribute, the media assets 112 and/or other data to any number of the various client devices. In this example system 100, service layer 102 includes storage media 114 to store or otherwise maintain various data and media assets, such as media assets 112 and media asset relationship data 116. The storage media 114 can be implemented as any type of memory, random access memory (RAM), a nonvolatile memory such as flash memory, read only memory (ROM), and/or other suitable electronic data storage.

The media assets 112 can include any type of audio, video, and/or image data received from any type of media content or data source. As described throughout, media assets can include music (e.g., digital music files of songs), television programming, movies, on-demand media assets, interactive games, network-based applications, and any other audio, video, and/or image data (e.g., to include program guide data, user interface data, advertising content, closed captions data, content metadata, search results and/or recommendations, etc.).

The media asset relationship data 116 represents relationships between the media assets 112 and can be used to identify media assets that are similar to each other, such as by artist, performer, singer, actor, genre, tempo, or by any other relatable feature or aspect of the media assets. A genre describes the media assets, such as music content or video content. A genre of video content may be described as being an advertisement, a movie, a comedy show, a sporting event, a news program, a sitcom, a talk show, an action/adventure program, or as any number of other category descriptions. A genre of music content may be described as country-western, blues, jazz, rock, instrumental, acoustic, easy-listening, or as any number of other category descriptions.

The service layer 102 includes an asset model generation service 118 that can be implemented as computer-executable instructions and executed by processors to implement the various embodiments and/or features described herein. In addition, the service layer 102 can be implemented with any number and combination of differing components as further described with reference to the example device shown in FIG. 5. The asset model generation service 118, as well as other functionality described to implement embodiments of client playlist generation, can also be provided as a service apart from the service layer 102 (e.g., on a separate server or by a third party service), or as a distributed service.

In an embodiment, the service layer 102 is a music service provider and the media assets 112 are music tracks that can be downloaded to a client device 104 and/or accessed for playback at a client device, such as when a client device subscribes to the music service provider. The asset model generation service 118 is implemented to determine track-to-track relationships from the media asset relationship data 116 to identify similar music tracks that can be included in an automatic playlist of the similar music tracks. For example, the track-to-track relationships can be determined utilizing conditional probability, lift cosine distance, and the like. A relationship between music tracks can be based on a similarity measure, either by usage or probability. For example, there is a probability that when a user selects to playback a song A, then a song B will also be selected for playback. The probability or measure can be represented by a number, and if the number relation is above a defined threshold, then song B can be determined similar to song A. The asset model generation service 118 can then generate projection vectors 120 of the track-to-track relationships for each of the music tracks. A projection vector 120 for a music track identifies the similar music tracks that are related to the music track.

The projection vectors 120 can then be communicated to any of the client devices 104 when requested. Any of the various client devices 104 can include a playlist generator 122 that utilizes the projection vectors to generate an automatic playlist 124 for any one of the music tracks that is selected as a starting music track of the automatic playlist. The playlist generator 122 is implemented to calculate the distances between the starting music track and the similar music tracks using the projection vectors for each music track to generate the automatic playlist. The automatic playlist 124 is a list of music tracks that are recommend from a library of media assets 126, such as music tracks stored on the client device that are similar to the selected music tracks. When a user at a client device wants to create a playlist, a music track is selected as the seed to the client-side playlist generator 122. The playlist generator 122 then calculates the distances between music tracks using the projection vectors for each music track. The projection distance between each music track can be given by the Hamming distance between each projection vector.

The asset model generation service 118 at the service layer 102 is implemented to utilize random projection to generate the projection vectors 120 of the asset-to-asset relationships for each of the media assets, or similarly the projection vectors 120 of the track-to-track relationships for each of the music tracks in the ongoing example of a music service provider. A projection vector 120 for a music track is generated based on a weighted similarity measure between the music track and each of the similar music tracks. In an embodiment, a projection vector for a music track is generated by initializing the projection vector of a dimension length, and then for each of the similar music tracks, a random number is generated from a track identifier that is unique to each of the similar music tracks. The identifier for a music track can be run through a hashing algorithm that returns an integer, and the integer number is then input to a random number generator which produces a series of numbers between −1 and +1, and the numbers produced is equal to the dimensionality of the projection. Each music track identifier results in a different sequence of random numbers as generated by the random number generator.

A product is then generated by multiplying the random number by a weight of the track-to-track relationship between the music track and the similar music track. The product is added to the projection vector at a next position index in the projection vector. A projection vector 120 is a compressed representation of all the music tracks, and each element of the projection vector is a floating point number. Each element in the projection vector can then be quantized to either positive one (+1) or zero for a binary representation of the elements. For example, if an element number is greater than zero, then the number is set as positive one (+1), and if an element number is less than or equal to zero, then the number is set as zero. This series of integers can then be communicated to a client device 104 for use by the playlist generator 122. This description can be represented by the pseudo-code:

---

Calculate the asset-to-asset relationships;
Project the asset-to-asset relationships into random space as follows:
For each asset:
    Initialize a projection vector of length M to zero for all elements.
    M is the dimensionality of the projection;
For each related asset:
    Initialize a random number generator using a related asset identifier
    as a seed to the random number generator;
For index = 0 to M − 1
    Get the next random number using the random number generator.
    The number is in the range of doubles [−1, 1];
    Multiply the random number by the asset-to-asset weight as
    determined above;
    Add the resulting product to the projection vector at position index;
    End
End
    Store resulting projection vector into database.
End In an embodiment, the asset model generation service 118 at the service layer 102 can receive an automatic playlist 124 from a client device 104 after the automatic playlist is generated. The asset model generation service 118 can then determine additional music tracks that are related to the similar music tracks in the automatic playlist, yet the additional music tracks are not stored for playback at the client device. The client device can then download the additional music tracks and/or access and playback the additional music tracks as part of the automatic playlist.

In this example system 100, wireless devices can include any type of device implemented to receive and/or communicate wireless data, such as any one or combination of a mobile phone 128 (e.g., cellular, VoIP, WiFi, etc.), a portable computer device 130, a media device 132 (e.g., a personal media player, portable media player, etc.), and/or any other wireless device that can receive media assets in any form of audio, video, and/or image data. A client system can include a respective client device and display device 134 that together render or playback any form of audio, video, and/or image media content and media assets.

The display device 134 can be implemented as any type of a television, high definition television (HDTV), LCD, or similar display system. A client device can be implemented as any one or combination of a television client device 136 (e.g., a television set-top box, a digital video recorder (DVR), etc.), a computer device 138, a gaming system 140, an appliance device, an electronic device, and/or as any other type of client device or user device that may be implemented to receive media assets in any form of audio, video, and/or image data in a media asset distribution system.

Any of the various user devices 104 can be implemented with one or more processors, communication components, memory components, signal processing and control circuits, and a media asset rendering system. Further, any of the wireless devices and/or other client devices can be implemented with any number and combination of differing components as further described with reference to the example device shown in FIG. 2, and with reference to the example device shown in FIG. 5. A user device may also be associated with a user (i.e., a person) and/or an entity that operates the device such that a user device describes logical devices that include users, software, and/or a combination of devices.

Any of the user devices 104 can communicate with service layer 102 via a two-way data communication link of the communication network 106. It is contemplated that any one or more of the arrowed communication links, along with communication network 106, facilitate two-way data communication, such as from a user device 104 to the service layer 102 and vice-versa.

Figure 2:
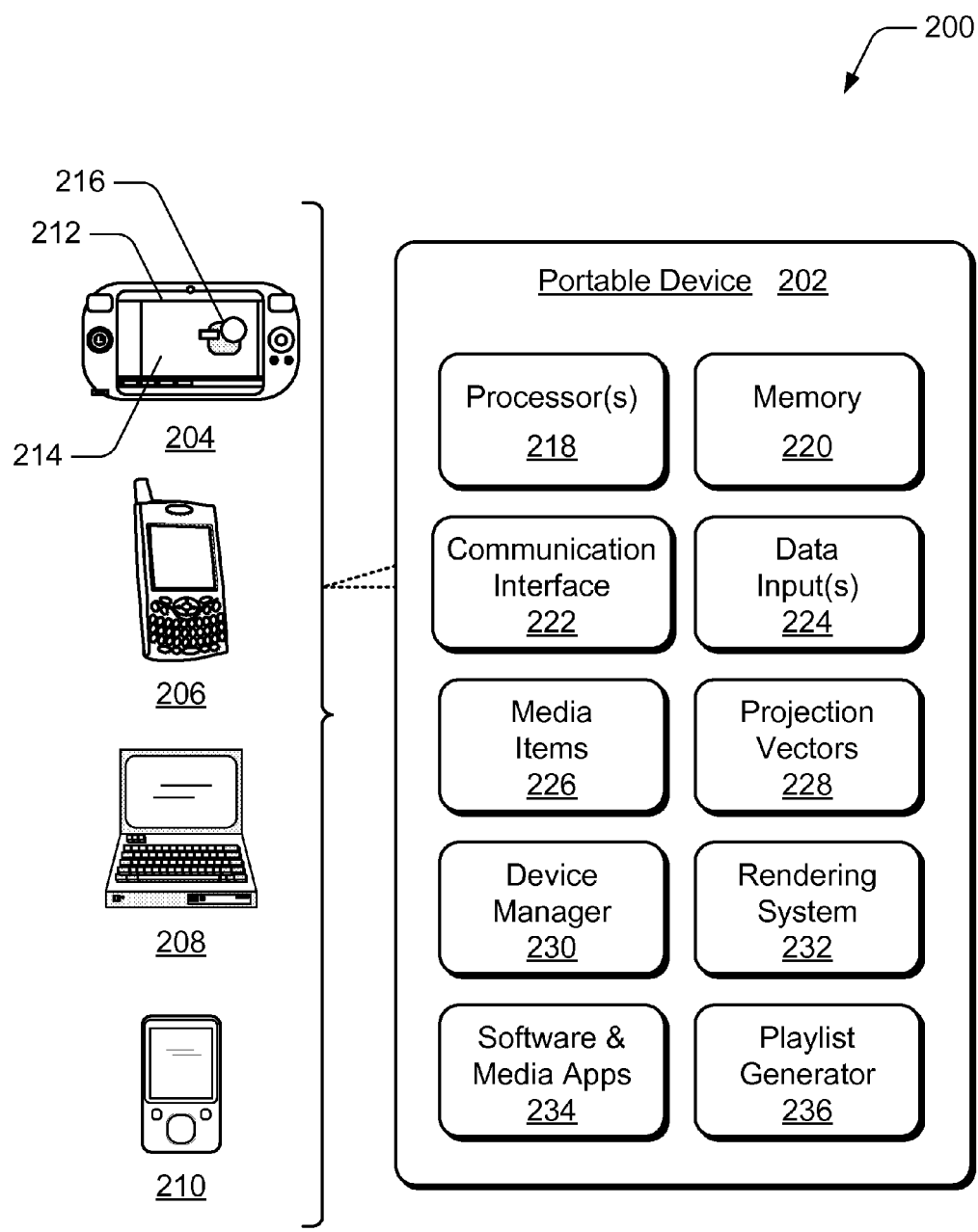
FIG. 2 illustrates an example system and client device in which embodiments of client playlist generation can be implemented.

FIG. 2 illustrates an example system 200 in which various embodiments of client playlist generation can be implemented. Example system 200 includes a portable device 202 (e.g., a wired and/or wireless device) that can be any one or combination of a mobile personal computer 204, a personal digital assistant (PDA), a mobile phone 206 (e.g., cellular, VoIP, WiFi, etc.) that is implemented for data, messaging, and/or voice communications, a portable computer device 208 (e.g., a laptop computer, a laptop computer with a touch-screen, etc.), a media device 210 (e.g., a personal media player, portable media player, etc.), a gaming device, an appliance device, an electronic device, and/or any other type of portable device that can receive, display, and/or communicate data in any form of audio, video, and/or image data.

Each of the various portable devices (e.g., also referred to as client devices) can include an integrated display and/or an integrated touch-screen, as well as selectable input controls via which a user can input data and/or selections. For example, mobile personal computer 204 includes an integrated touch-screen 212 on which a user interface 214 can be displayed that includes displayable objects and/or user interface elements 216, such as any type of an icon, image, graphic, text, selectable button, user-selectable control, menu selection, map element, and/or any other type of user interface displayable feature or item.

Any of the various portable devices described herein can be implemented with one or more sensors, processors, communication components, data inputs, memory components, storage media, processing and control circuits, and/or a content rendering system. Any of the portable devices can also be implemented for communication via communication networks that can include any type of a data network, voice network, broadcast network, an IP-based network, and/or a wireless network that facilitates data, messaging, and/or voice communications. A portable device can also be implemented with any number and combination of differing components as described with reference to the example device shown in FIG. 5. A portable device may also be associated with a user (i.e., a person) and/or an entity that operates the device such that a portable device describes logical devices that include users, software, and/or a combination of devices.

In this example, portable device 202 includes one or more processors 218 (e.g., any of microprocessors, controllers, and the like), a memory 220, a communication interface 222 for data, messaging, and/or voice communications, and data inputs 224 to receive media items 226 and/or media content, as well as projection vectors 228. Media items can include any type of email messages, text messages, digital photos, song selections, and the like. Media content (e.g., to include recorded media content) can include any type of audio, video, and/or image data received from any media content or data source, such as messages, television media content, music, video clips, data feeds, interactive games, network-based applications, and any other content.

Portable device 202 is implemented with a device manager 230 that includes any one or combination of a control application, software application, signal processing and control module, code that is native to the particular device, and/or a hardware abstraction layer for the particular device. Portable device 202 also includes a rendering system 232 to render user interfaces and user interface elements for display on any of the portable devices. The rendering system 232 is also implemented to receive and render any form of audio, video, and/or image data received from any media content and/or data source.

Portable device 202 includes various software and/or media applications 234 that may incorporate components and/or modules that can be processed or otherwise executed by the processors 218. The media applications 234 can include a music and/or video player, a Web browser, an email application, a messaging application, a photo viewer, and the like. The software and/or media applications 234 can also include an operating system and a playlist generator 236 to implement various embodiments of client playlist generation at a client device as described herein. Features and aspects of the playlist generator 236 are described with reference to the playlist generator 122 shown in FIG. 1 at a client device 104.

Example methods 300 and 400 are described with reference to FIGS. 3 and 4 in accordance with one or more embodiments of client playlist generation. Generally, any of the functions, methods, procedures, components, and modules described herein can be implemented using hardware, software, firmware, fixed logic circuitry, manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The methods may also be practiced in a distributed computing environment by processing devices that are linked through a communication network. In a distributed computing environment, computer-executable instructions may be located in both local and remote computer storage media and/or devices. Further, the features described herein are platform-independent and can be implemented on a variety of computing platforms having a variety of processors.

Figure 3:
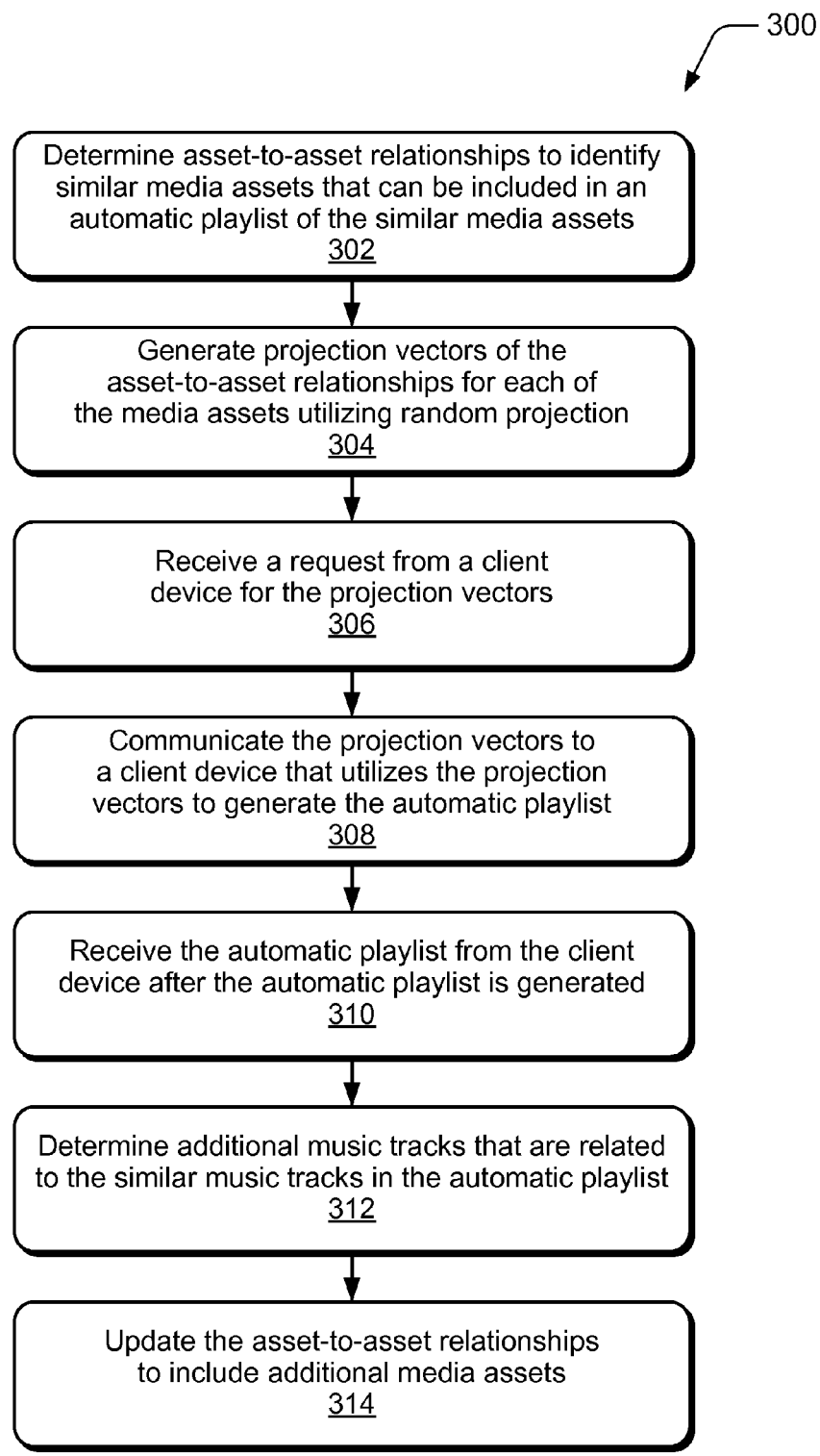
FIG. 3 illustrates example method(s) for client playlist generation in accordance with one or more embodiments.

FIG. 3 illustrates example method(s) 300 of client playlist generation. The order in which the method is described is not intended to be construed as a limitation, and any number of the described method blocks can be combined in any order to implement the method, or an alternate method.

At block 302, asset-to-asset relationships are determined to identify similar media assets that can be included in an automatic playlist of the similar media assets. In various implementations, the media assets 112 may be digital files of music tracks, books stored as digital media, or video programs, such as television programs, movies, music videos, and the like. For example, the asset model generation service 118, such as at a music service provider (e.g., the service layer 102), determines track-to-track relationships to identify similar music tracks that can be included in the automatic playlist of the similar music tracks.

At block 304, projection vectors of the asset-to-asset relationships for each of the media assets are generated utilizing random projection. For example, the asset model generation service 118 generates the projection vectors 120 of the track-to-track relationships for each of the music tracks. A projection vector 120 for a music track identifies the similar music tracks that are related to the music track. The asset model generation service 118 utilizes random projection to generate the projection vectors based on a weighted similarity measure between a music track and each of the similar music tracks. Generation of the projection vectors is further described with reference to FIG. 4.

At block 306, a request is received from a client device for the projection vectors. For example, a client device 104 requests the projection vectors 120 for each of the music tracks that are included in a music library 126 stored on the client device. At block 308, the projection vectors are communicated to a client device that utilizes the projection vectors to generate the automatic playlist. For example, a playlist generator 122 at a client device 104 utilizes the projection vectors to generate the automatic playlist for any one of the music tracks stored on the client device that is selected as a starting music track of the automatic playlist. The automatic playlist 124 can be generated when the client device is off-line from the music service provider.

At block 310, the automatic playlist is received from the client device after the automatic playlist is generated and, at block 312, additional music tracks that are related to the similar music tracks in the automatic playlist are determined. For example, the music service provider (e.g., the service layer 102) receives the automatic playlist 124 from the client device 104 that generates the automatic playlist. The music service provider then determines additional music tracks that are not stored for playback at the client device, yet that are related to the similar music tracks in the automatic playlist.

At block 314, the asset-to-asset relationships are updated to include additional media assets. For example, the asset model generation service 118, such as at a music service provider (e.g., the service layer 102), updates the asset-to-asset relationships to include any new or additional media assets, such as when new music tracks are released. A new music track may be similar to existing music tracks, and the new music track is included as a similar music track. Similar to block 304, additional projection vectors of the asset-to-asset relationships for each of the additional media assets are generated by the asset model generation service 118, and similar to block 308, the additional projection vectors are communicated to a client device 104 (e.g., when requested) to update the client device for the additional media assets.

Figure 4:
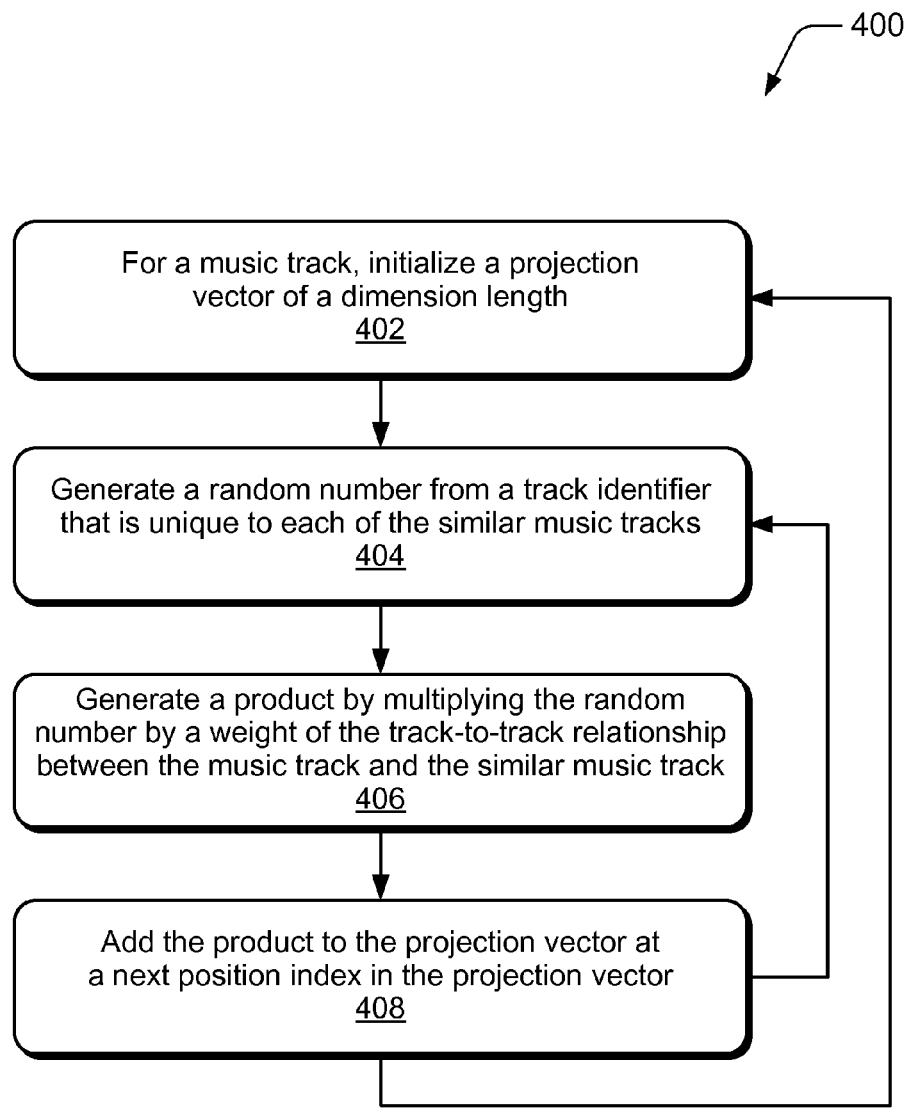
FIG. 4 illustrates example method(s) for client playlist generation in accordance with one or more embodiments.

FIG. 4 illustrates example method(s) 400 of client playlist generation, and describes an embodiment to generate the projection vectors. The order in which the method is described is not intended to be construed as a limitation, and any number of the described method blocks can be combined in any order to implement the method, or an alternate method.

The asset model generation service 118 at a music service provider (e.g., the service layer 102) generates a projection vector utilizing random projection for each music track as described with reference to blocks 402-408. At block 402, a projection vector of a dimension length is initialized for a music track. Then, for each of the other music tracks, a projection vector index for a similar music track is determined at blocks 404-408. At block 404, a random number is generated from a track identifier that is unique to each of the similar music tracks. At block 406, a product is generated by multiplying the random number by a weight of the track-to-track relationship between the music track and the similar music track. At block 408, the product is added to the projection vector at a next position index in the projection vector. Blocks 404-408 are then repeated to generate the projection vector indexes for the similar music tracks, and blocks 402-408 are repeated for each music track.

Figure 5:
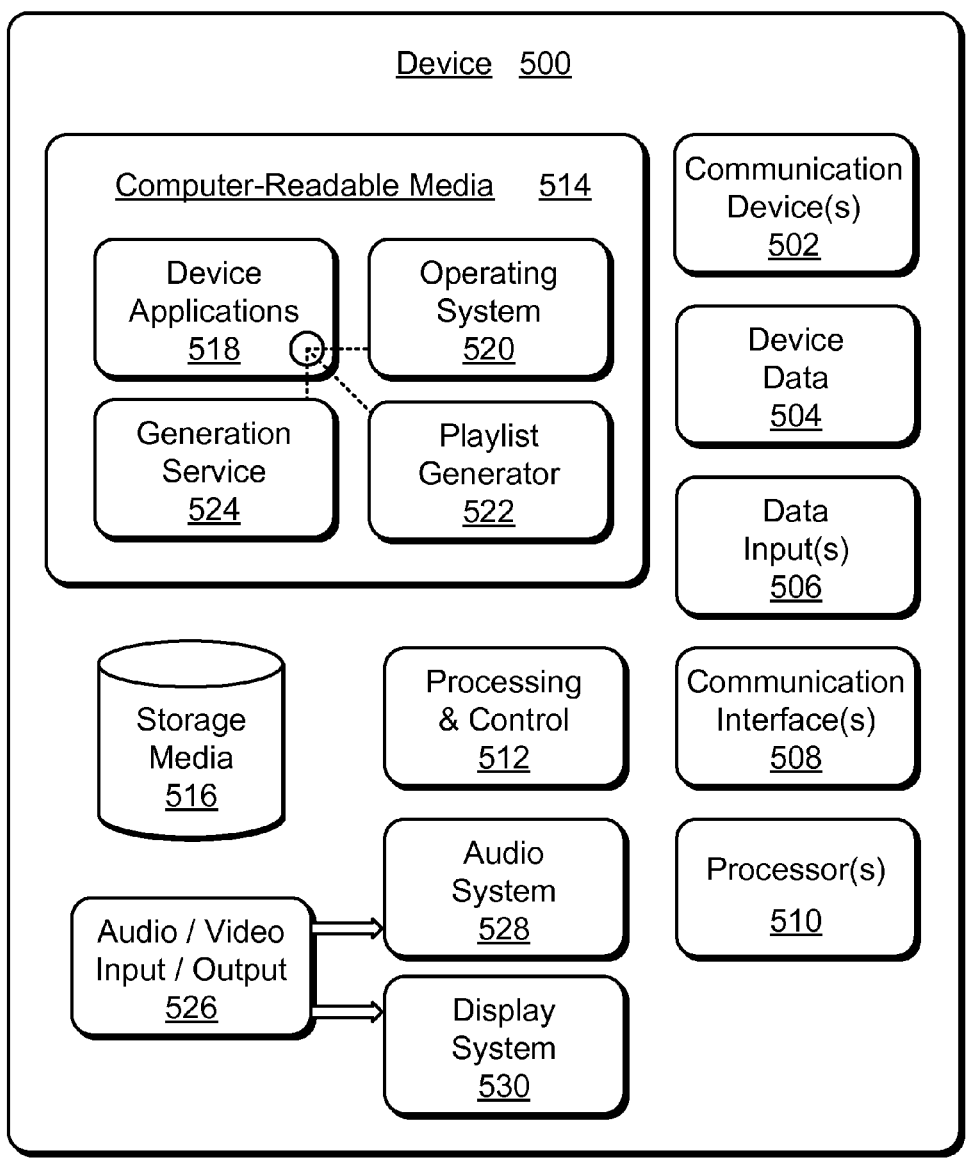
FIG. 5 illustrates various components of an example device that can implement embodiments of client playlist generation.

FIG. 5 illustrates various components of an example device 500 that can be implemented as any type of device and/or service layer as described with reference to FIGS. 1 and 2 to implement embodiments of client playlist generation. In embodiments, device 500 can be implemented as any one or combination of a wired and/or wireless device, as any form of television client device (e.g., television set-top box, digital video recorder (DVR), etc.), consumer device, computer device, server device, portable computer device, user device, communication device, video processing and/or rendering device, appliance device, gaming device, electronic device, and/or as any other type of device. Device 500 may also be associated with a user (i.e., a person) and/or an entity that operates the device such that a device describes logical devices that include users, software, firmware, and/or a combination of devices.

Device 500 includes communication devices 502 that enable wired and/or wireless communication of device data 504 (e.g., received data, data that is being received, data scheduled for broadcast, data packets of the data, etc.). The device data 504 or other device content can include configuration settings of the device, media content stored on the device, and/or information associated with a user of the device. Media content stored on device 500 can include any type of audio, video, and/or image data. Device 500 includes one or more data inputs 506 via which any type of data, media content, and/or inputs can be received, such as user-selectable inputs, messages, music, television media content, recorded video content, and any other type of audio, video, and/or image data received from any content and/or data source.

Device 500 also includes communication interfaces 508 that can be implemented as any one or more of a serial and/or parallel interface, a wireless interface, any type of network interface, a modem, and as any other type of communication interface. The communication interfaces 508 provide a connection and/or communication links between device 500 and a communication network by which other electronic, computing, and communication devices communicate data with device 500.

Device 500 includes one or more processors 510 (e.g., any of microprocessors, controllers, and the like) which process various computer-executable instructions to control the operation of device 500 and to implement embodiments of client playlist generation. Alternatively or in addition, device 500 can be implemented with any one or combination of hardware, firmware, or fixed logic circuitry that is implemented in connection with processing and control circuits which are generally identified at 512. Although not shown, device 500 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 500 also includes computer-readable media 514, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 500 can also include a mass storage media device 516.

Computer-readable media 514 provides data storage mechanisms to store the device data 504, as well as various device applications 518 and any other types of information and/or data related to operational aspects of device 500. For example, an operating system 520 can be maintained as a computer application with the computer-readable media 514 and executed on processors 510. The device applications 518 can include a device manager (e.g., a control application, software application, signal processing and control module, code that is native to a particular device, a hardware abstraction layer for a particular device, etc.). The device applications 518 also include any system components or modules to implement embodiments of client playlist generation. In this example, the device applications 518 can include a playlist generator 522 when device 500 is implemented as a client device, and can include an asset model generation service 524 when device 500 is implemented as a server device or service layer. The playlist generator 522 and the asset model generation service 524 are shown as software modules and/or computer applications. Alternatively or in addition, the playlist generator 522 and the asset model generation service 524 can be implemented as hardware, software, firmware, or any combination thereof.

Device 500 also includes an audio and/or video input-output system 526 that provides audio data to an audio system 528 and/or provides video data to a display system 530. The audio system 528 and/or the display system 530 can include any devices that process, display, and/or otherwise render audio, video, and image data. Video signals and audio signals can be communicated from device 500 to an audio device and/or to a display device via an RF (radio frequency) link, S-video link, composite video link, component video link, DVI (digital video interface), analog audio connection, or other similar communication link. In an embodiment, the audio system 528 and/or the display system 530 are implemented as external components to device 500. Alternatively, the audio system 528 and/or the display system 530 are implemented as integrated components of example device 500.

Although embodiments of client playlist generation have been described in language specific to features and/or methods, it is to be understood that the subject of the appended claims is not necessarily limited to the specific features or methods described. Rather, the specific features and methods are disclosed as example implementations of client playlist generation.

The invention claimed is:

1. A computer-implemented method, comprising:
   determining asset-to-asset relationships to identify similar media assets that can be included in an automatic playlist of the similar media assets;
   generating projection vectors of the asset-to-asset relationships for each of the media assets utilizing random projection, each projection vector for a media asset initialized to a dimension length for elements of the projection vector that identifies the similar media assets, and for each of the similar media assets:
   applying a hashing algorithm to an asset identifier that is unique to a similar media asset to derive an integer number;
   utilizing a random number generator to generate a series of random numbers for the similar media asset from the integer number, the series of random numbers that are generated corresponding to the dimension length of the projection vector;
   generating a product by multiplying one of the random numbers by a weight of the asset-to-asset relationship between the media asset and the similar media asset, the weight of the asset-to-asset relationship indicating a similarity between the media asset and the similar media asset;
   adding the product to the projection vector for the media asset at a next position index in the projection vector; and
   quantizing the product for each element of the projection vector for the media asset to produce a binary representation of the elements; and
   communicating the projection vectors for each of the media assets to a client device that is configured to utilize the projection vectors to generate the automatic playlist for any one of the media assets that is selected as a starting media asset of the automatic playlist.

2. A computer-implemented method as recited in claim 1, wherein the media assets are at least one of digital files of music tracks, books stored as digital media, or video programs.

3. A computer-implemented method as recited in claim 1, wherein the media assets are music tracks stored for playback at the client device, and wherein the method further comprises:
   determining track-to-track relationships to identify similar music tracks that can be used for generation of the automatic playlist of the similar music tracks;
   generating the projection vectors of the track-to-track relationships for each of the music tracks, the projection vector for a music track identifying the similar music tracks; and
   communicating the projection vectors to the client device that is configured to utilize the projection vectors to generate the automatic playlist for any one of the music tracks that is selected as a starting music track of the automatic playlist.

4. A computer-implemented method as recited in claim 3, further comprising receiving a request from the client device for the projection vectors that are generated at a music service provider; and
   wherein the client device is further configured to utilize the projection vectors to generate the automatic playlist when off-line from the music service provider.

5. A computer-implemented method as recited in claim 4, further comprising:
   receiving the automatic playlist from the client device after the automatic playlist is generated; and
   determining additional music tracks that are related to the similar music tracks in the automatic playlist, wherein the additional music tracks are not stored for playback at the client device.

6. A computer-implemented method as recited in claim 3, further comprising utilizing random projection to generate the projection vectors of the track-to-track relationships for each of the music tracks.

7. A computer-implemented method as recited in claim 6, wherein a projection vector for a music track is generated based on a weighted similarity measure between the music track and each of the similar music tracks.

8. A computer-implemented method as recited in claim 6, further comprising generating the projection vector for the music track by initializing the projection vector of the dimension length, and for each of the similar music tracks:
   generating the series of random numbers from a track identifier that is unique to each of the similar music tracks; and
   generating the product by multiplying one of the random numbers by a weight of the track-to-track relationship between the music track and the similar music track.

9. A computer-implemented method as recited in claim 1, further comprising:
   updating the asset-to-asset relationships to include additional media assets;
   generating additional projection vectors of the asset-to-asset relationships for each of the additional media assets; and
   communicating the additional projection vectors to update the client device for the additional media assets.

10. A computer-implemented method as recited in claim 1, further comprising:
    receiving the automatic playlist from the client device after the automatic playlist is generated by the client device, the automatic playlist comprising media assets that are stored for playback by the client device; and
    determining additional media assets that are related to the similar media assets in the automatic playlist, the additional media assets available to the client device for download.

11. A computer-implemented method as recited in claim 10, wherein the additional media assets that are available to the client device for download are not stored for playback at the client device when the additional media assets are determined.

12. A music service provider, comprising:
    storage media configured to maintain media asset relationship data that identifies music tracks;
    a communication device configured to communicate projection vectors to a client device that is configured to utilize the projection vectors to generate an automatic playlist for any one of the music tracks that is selected as a starting music track of the automatic playlist;
    at least a memory and a processor that implement an asset model generation service configured to:
    determine track-to-track relationships from the media asset relationship data to identify similar music tracks that can be included in the automatic playlist of the similar music tracks;
    generate the projection vectors of the track-to-track relationships for each of the music tracks utilizing random projection, each projection vector for a music track initialized to a dimension length for elements of the projection vector that identifies the similar music tracks, and for each of the similar music tracks:
    apply a hashing algorithm to a track identifier that is unique to a similar music track to derive an integer number;
    generate a series of random number from a numbers for the track identifier from the integer number that is unique to a similar music track, the series of random number numbers that are generated corresponding to the dimension length of the projection vector;
    generate a product by multiplying one of the random number numbers by a weight of the track-to-track relationship between the music track and the similar music track, the weight of the track-to-track relationship indicating a similarity between the music track and the similar music track;
    add the product to the projection vector for the music track at a next position index in the projection vector, the product being added to the projection vector as an element of the projection vector; and
    quantize the product for each element of the projection vector for the music track to produce a binary representation of the elements as either zero (0) or positive one (+1).

13. A music service provider as recited in claim 12, wherein a projection vector for a music track is generated based on a weighted similarity measure between the music track and each of the similar music tracks.

14. A music service provider as recited in claim 12, wherein the asset model generation service is further configured to:
    receive the automatic playlist from the client device after the automatic playlist is generated; and
    determine additional music tracks that are related to the similar music tracks in the automatic playlist, wherein the additional music tracks are not stored for playback at the client device.

15. A client device, comprising:
    a storage media configured to maintain a library of music tracks and projection vectors of track-to-track relationships for each of the music tracks, a projection vector for a music track identifying similar music tracks;
    at least a memory and a processor that implement a playlist generator configured to:
    communicate a request to a music service provider for the projection vectors when the client device is on-line and configured for communication with the music service provider;
    receive the projection vectors from the music service provider that generates the projection vectors of the track-to-track relationships for each of the music tracks by random projection, each projection vector for a music track initialized to a dimension length for elements of the projection vector that identifies the similar music tracks, and for each of the similar music tracks:
    apply a hashing algorithm to a track identifier that is unique to a similar music track to derive an integer number;
    utilize a random number generator to generate a series of random numbers between negative one (−1) and positive one (+1) for the similar music track from the integer number, the series of random numbers that are generated corresponding to the dimension length of the projection vector;

generate a product by multiplying one of the random numbers by a weight of the track-to-track relationship between the music track and the similar music track, the weight of the track-to-track relationship indicating a similarity between the music track and the similar music track; and add the product to the projection vector for the music track at a next position index in the projection vector;

quantize the product for each element of the projection vector for the music track to produce a binary representation of the elements; and utilize the projection vectors to generate an automatic playlist for any one of the music tracks that is selected as a starting music track of the automatic playlist, the automatic playlist configured to be generated when the client device is off-line from the music service provider.

16. A client device as recited in claim 15, wherein the playlist generator is further configured to calculate the distances between the starting music track and the similar music tracks using the projection vectors for each music track to generate the automatic playlist.

17. A client device as recited in claim 15, wherein a projection vector for a music track is generated based on a weighted similarity measure between the music track and each of the similar music tracks.

18. A client device as recited in claim 15, wherein the playlist generator is further configured to communicate the automatic playlist to the music service provider after the automatic playlist is generated, where the music service provider is configured to determine additional music tracks that are related to the similar music tracks in the automatic playlist, and wherein the additional music tracks are not stored for playback at the client device.

19. A client device as recited in claim 18, wherein the additional music tracks that are determined to be related are available for download by the client device.

* * * * *